S P. & H B Cook. Journal Bearing

117868                                    PATENTED AUG 8 1871

Witnesses                                 Inventors

UNITED STATES PATENT OFFICE.

SYDNEY P. COOK AND HIRAM BURT COOK, OF SAN FRANCISCO, CALIFORNIA.

IMPROVEMENT IN JOURNAL-BEARINGS.

Specification forming part of Letters Patent No. 117,868, dated August 8, 1871.

*To all whom it may concern:*

Be it known that we, SYDNEY P. COOK and HIRAM BURT COOK, of the city and county of San Francisco, State of California, have invented an Improved Journal-Bearing; and we do hereby declare the following description and accompanying drawing are sufficient to enable any person skilled in the art or science to which it most nearly appertains to make and use our said invention or improvements without further invention or experiment.

Our invention relates to an improved bushing or bearing for journals, which is applicable more particularly for bushing the rollers or wheels employed upon the parlor or roller-skate; and it consists in the employment of ivory or other analogous bone properly turned and fitted into the rollers so as to provide a firm smooth surface for the axle to bear upon.

Figure 1:
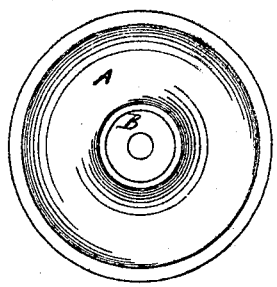
Figure 2:
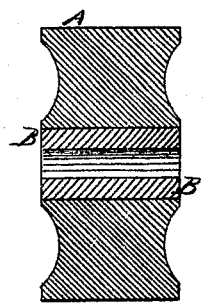

Referring to the accompanying drawing, A represents a roller or wheel of that kind which is usually employed on roller or parlor-skates. B, Fig. 2, represents a tube or bushing made of ivory or other analogous bone, properly turned, fitted, and permanently fixed in the center of the wheel, in the ordinary manner of bushing wheels and rollers.

Various methods of fixing the bushing in the wheel may be employed, as by the use of glue, cement, or keys; but we can use either of them.

This bushing, when employed in skate-rollers, owing to its extreme hardness and smoothness, renders the movement of the rollers easy and free. The roller will move with much less friction than when wood or metal is used; consequently, the wear upon the axle, and also upon the bushing, will be less.

This substance or material can also be used for the bearings of journals in various other places with equal advantages.

Having thus described our invention, what we claim, and desire to secure by Letters Patent, is—

Ivory or any analogous bone as a bearing for journals, substantially as and for the purpose above described.

In witness that the above-described invention is claimed by us we have hereunto set our hands.

S. P. COOK.
HIRAM BURT COOK.

Witnesses:
 GEO. H. STRONG,
 BENJN. C. FABRE.